United States Patent
McDowell, III (10) Patent No.: US 10,926,929 B2
(45) Date of Patent: Feb. 23, 2021

(54) RELEASABLE CABLE TIE

(71) Applicant: George R. McDowell, III, Hellertown, PA (US)

(72) Inventor: George R. McDowell, III, Hellertown, PA (US)

(73) Assignee: KML Holding Group LLC, Quakertown, PA (US)

( * ) Notice: Subject to any disclaimer, the term of this patent is extended or adjusted under 35 U.S.C. 154(b) by 6 days.

(21) Appl. No.: 16/202,508

(22) Filed: Nov. 28, 2018

(65) Prior Publication Data

US 2019/0168937 A1  Jun. 6, 2019

Related U.S. Application Data

(60) Provisional application No. 62/593,908, filed on Dec. 2, 2017.

(51) Int. Cl.
*B65D 63/10* (2006.01)
*H02G 3/32* (2006.01)

(52) U.S. Cl.
CPC .......... *B65D 63/1072* (2013.01); *H02G 3/32* (2013.01); *B65D 2563/106* (2013.01); *B65D 2563/107* (2013.01)

(58) Field of Classification Search
CPC ........ B65D 2563/106; B65D 2563/107; B65D 63/1072; H02G 3/32
See application file for complete search history.

(56) References Cited

U.S. PATENT DOCUMENTS

| | | | |
|---|---|---|---|
| 3,747,164 A | 7/1973 | Fortsch | |
| 3,908,233 A | 9/1975 | Caveny | |
| 3,991,444 A | 11/1976 | Bailey | |
| 4,236,280 A | 12/1980 | Kreiseder | |
| 4,287,644 A | 9/1981 | Durand | |
| 4,805,856 A | 2/1989 | Nicoll | |
| 4,813,105 A | 3/1989 | Espinosa | |
| 5,193,250 A | 3/1993 | Caveny | |
| 5,577,698 A | 11/1996 | Liu | |
| 5,697,455 A | 11/1997 | Alexander | |
| 5,758,390 A | 6/1998 | Villeneuve | |
| 5,890,265 A | 4/1999 | Christian | |
| 5,901,416 A | 5/1999 | Mears | |
| 6,185,791 B1 | 2/2001 | Khokhar | |
| 7,866,005 B2 | 1/2011 | Vermeer | |
| 8,499,419 B2 | 8/2013 | Cheng | |
| 8,955,198 B2 | 2/2015 | Carnevali | |
| 9,820,752 B2 * | 11/2017 | O'Neil | B65D 63/1063 |
| 2012/0054988 A1 | 3/2012 | Cheng | |
| 2016/0113660 A1 | 4/2016 | O'Neil | |

* cited by examiner

*Primary Examiner* — Robert Sandy
*Assistant Examiner* — David M Upchurch
(74) *Attorney, Agent, or Firm* — Douglas J. Ryder; Ryder, Mazzeo & Konieczny LLC (57) ABSTRACT

A releasable cable tie and method providing a molded one-piece thermoplastic elongated planar strap for binding electrical cables and a plurality of strap teeth formed on one side of the strap for engaging a locking head formed at one end of the strap. A novel releasable latch on the locking head provides a large and wide thumb pad having a width at least 95% of the width of the strap and an index finger back plate positioned below the thumb pad and having a width and length at least as large as the width and height of the thumb pad.

18 Claims, 4 Drawing Sheets

RELEASABLE CABLE TIE

This application is a continuation-in-part of prior U.S. Provisional Patent Application Ser. No. 62/593,908, filed Dec. 2, 2017.

BACKGROUND OF THE INVENTION

1. Technical Field

The present invention relates to tie apparatus and method for tying and holding objects together. In one aspect, the present invention relates to tie apparatus and method for tying together electrical cables. In one aspect, the present invention relates to an electrical cable tie apparatus and method for use in the aviation industry.

2. Description of Related Art

Ties are used to tie and fasten electrical power cords or electrical cables or other objects to be bundled, for the purpose of holding the electrical power cords or electrical cables bundled neatly and securely together.

INTRODUCTION TO THE INVENTION

U.S. Pat. No. 8,499,419 discloses a releasable tie having arm 17 to facilitate disengagement but nowhere discloses the size dimensions of arm 17.

U.S. Pat. No. 4,236,280 discloses a releasable tie having latch 26 and a bend line or a pivot line of latch 26 but nowhere discloses the size dimensions of the latch 26.

U.S. Pat. No. 3,991,444 discloses a releasable cable tie having rigid lever 42 which is engaged by the user's finger nail (Col. 3, lines 37-40 and lines 59-62.)

U.S. Pat. No. 3,908,233 discloses a releasable cable tie having extension 260 but nowhere discloses the size dimensions the extension 260.

U.S. Pat. No. 4,805,856 discloses a releasable cable tie having release lever 29 but nowhere discloses the size dimensions of the release lever 29.

U.S. Pat. No. 6,185,791 discloses a releasable cable tie having latch 22 but nowhere discloses the size dimensions of the latch 22.

U.S. Pat. No. 7,866,005 discloses a releasable tie having release tab 42 but nowhere discloses the size dimensions of the release tab 42.

U.S. Pat. No. 5,901,416 discloses a releasable tie having clip 28 but nowhere discloses the size dimensions of the clip 28.

U.S. Pat. No. 5,890,265 discloses a parallel entry tie having tip 42 of locking tab 36. The tip portion 42 is lifted upwardly to disengage locking head teeth 44.

U.S. Pat. No. 5,193,250 discloses a releasable cable Lie having extension 34 which projects upwardly at the distal end from a pawl 28.

U.S. Pat. No. 5,687,455 discloses a releasable circular fastener having control end 20 of arm 19 but nowhere discloses the size dimensions of the arm 19.

U.S. Pat. No. 5,577,698 discloses a mount for festive ornaments having a locking member 15, 16, 17 for holding holiday decorations.

U.S. Pat. No. 1,813,105 discloses a cable clamp having an upper portion 88 of pawl 16 in the cable or wire bundles clamp for an aircraft hostile environment in an area of limited access.

U.S. Pat. No. 3,747,164 discloses a rotating release strap having member 62.

U.S. Pat. No. 8,955,198 discloses a thumb plate 82 for manual release of an interlock with a strap body.

Commercially available ties today, when tightened, cannot be released without damage to electrical power cords or electrical cables when bundled and tied tightly. When it is desired to add or remove more electrical power cords or electrical cables or objects in a tied bundle or to rearrange the objects already tied up, conventional ties must be cut and be replaced by new ones, which is not only inconvenient and costly, but more importantly, it leads to damage to the electrical power cords or electrical cables. Whenever any electrical power cord or electrical cable in a bundled tie is damaged, the entire electrical wiring must be replaced and redone. In the production of large airliners today, miles and miles of electrical cables would need to be replaced and redone.

SUMMARY OF THE INVENTION

The releasable cable tie apparatus and method of the present invention provide means and method to overcome the drawbacks and problems of the prior art. The present invention provides a releasable cable tie which includes a strap and a locking head. The strap has a first end and an opposite second end. The first end is connected to the locking head. The locking head is formed to provide a window. The opposite second end of the strap can be inserted through the window in the locking head and be engaged with the locking head so as to be fixed in position to the locking head.

The locking head includes a base plate, a pair of first side walls, a second side wall, and an operating rod. The base plate is formed to provide the window of the locking head and has a front end and a rear end. The pair of first side walls are provided on two opposite lateral sides on the front end of the base plate, respectively. The second side wall is disposed at the front end of the base plate and has two lateral sides connected to the first side walls, respectively.

The operating rod of the locking head of the present invention is provided above the window of the base plate and is bilaterally connected to the first side walls via connecting members. The operating rod has a first top surface. At least one first engaging tooth on the operating rod is provided at a predetermined depth extending vertically downward from the first top surface. At least one first engaging tooth has a second top surface which defines a tooth depth. The operating rod further includes an arm extending from the operating rod in a direction away from the strap.

The strap has a top surface and a bottom surface, wherein the top surface is closer to the arm of the operating rod than the bottom surface of the strap. The bottom surface of the strap is provided with a plurality of second engaging teeth which are engageable with the first engaging tooth of the operating rod of the locking head. The second engaging teeth have a predetermined tooth depth. The first engaging tooth depth of the locking head is greater than the second engaging tooth depth of the strap, and the predetermined depth is greater than the predetermined tooth pitch.

A primary object of the present invention is to provide the releasable tie of the present invention, wherein after the strap is inserted through the window of the locking head and because the first tooth depth of the first engaging tooth of the locking head is greater than the second tooth depth of the second engaging teeth of the strap, a small gap is formed between the first engaging tooth and the second engaging teeth engaged therewith. Consequently, the entry resistance of the strap is reduced to facilitate insertion of the strap body through the window.

Another object of the present invention is to provide a releasable cable tie and method of the present invention characterized by the predetermined depth between the first top surface of the operating rod and the first engaging tooth of the locking head and the predetermined tooth pitch of the second engaging teeth of the strap, and wherein the second engaging teeth of the strap are engaged with the first engaging tooth of the operating rod when the strap is inserted into the window of the locking head in a first direction. The predetermined depth, being greater than the predetermined tooth pitch, can accommodate at least two of the second engaging teeth at the same time to increase the resistance of the releasable tie against pulling.

Another object of the releasable cable tie and method of the present invention is to provide the releasable tie wherein the first top surface of the operating rod of the locking head has an extension length. With the extension length, the operating rod will not be overturned easily when the strap is subjected to external force, but will be pressed against the strap to keep the strap from getting loose from the locking head.

Another object of the present invention is to provide a releasable tie apparatus and method of the present invention wherein with the arm of the releasing tab extending from the operating rod, a user can easily apply a force to the arm to disengage the at least one first engaging tooth of the operating rod from the second engaging teeth of the strap body, thus allowing the second opposite end of the strap body to be pulled out of the window of the locking head. As such, the releasable tie features easy operation, repeated use, and a low cost of use, and more importantly no damage to the electrical power cords or electrical cables, when the cable tie is released and removed.

These and other objects of the apparatus and method of the present invention will be found from a close inspection of the formal views of the technical drawings and detailed description which follow.

BRIEF DESCRIPTION OF THE DRAWINGS

The structure of the present invention as well as a preferred mode of use, further objects, and advantages of the present invention will be understood by referring to the detailed description of an illustrative embodiment of the releasable cable tie of the present invention in conjunction with the accompanying formal views of the technical drawings, in which.

DETAILED DESCRIPTION OF THE INVENTION

The present invention provides novel apparatus and method including a releasable cable tie wherein the engaging teeth of an elongated strap are employed and operated in novel manner of releasable engagement between the engaging teeth of a locking head for achieving a fixing effect. The drawings referred to in the following detailed description identify, describe, and demonstrate the important features of the novel releasable cable tie of the present invention.

Figure 1:
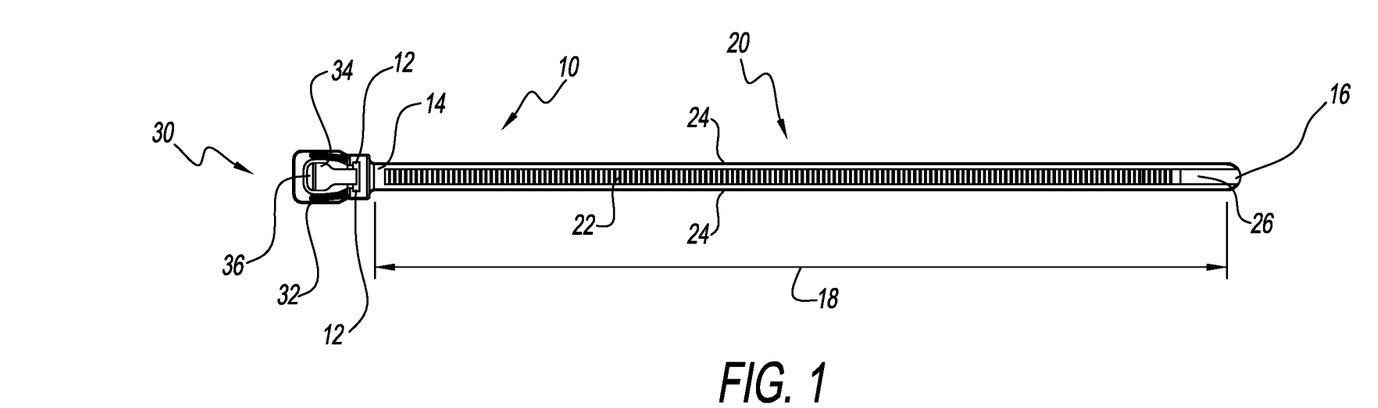
FIG. 1 is a top plan view of the releasable cable tie according to a preferred embodiment of the present invention.

Referring now to FIG. 1, a releasable tie 10 according to a preferred embodiment of the present invention includes an elongated planar strap 20 and a locking head 30. The locking head 30 is formed to have a window 12, wherein the window 12 provides a channel, passageway, or window extending entirely through the locking head 30. The elongated strap 20 has a first end 14 and a second opposite end 16. The first end 14 of strap 20 is connected to the looking head 30. The second opposite end 16 of strap 20 can be inserted through the window 12 of the locking head 30 and be engaged with the locking head 30 so as to be fixed in position thereto and tie together objects to be bundled.

Releasing strap 20 is shown having elongated length 18. Releasing locking teeth 22 on top of strap 20 provide means for locking the adjustable strap into locking head 30. Release guide rails 24 provide means for gliding strap 20 into window 12 of locking head 30. Release strap tongue 26 guides the insertion of glide rails 24 into window 12.

Figure 2:
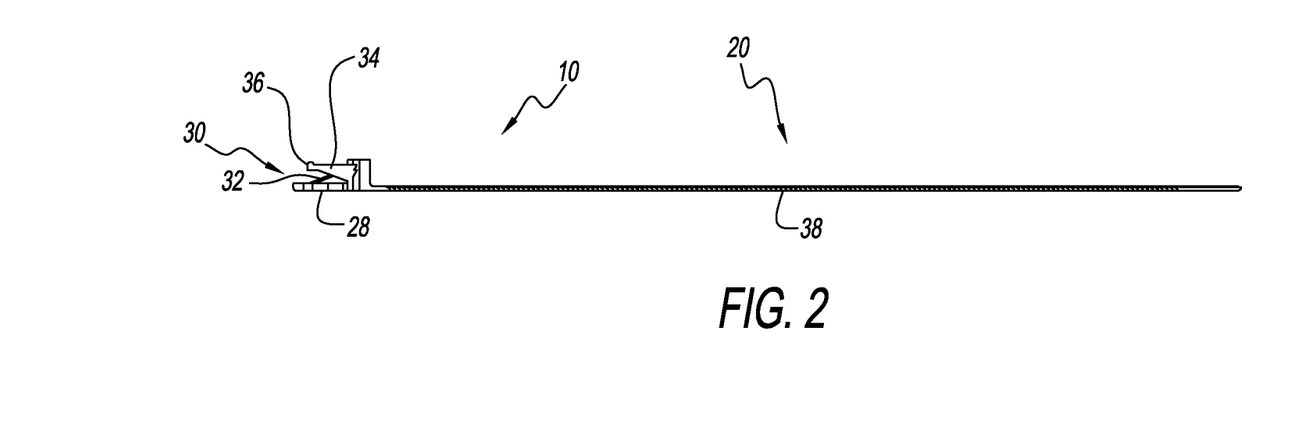
FIG. 2 is an elevation view of the releasable cable tie according to a preferred embodiment of the present invention.

Referring now to top plan view FIG. 1 and corresponding elevation view FIG. 2, bottom plate 28 on releasing head 30 incorporates index finger pad supports 32. Release thumb pad 34 is provided with release ripple trip/thumb grip 36. Strap bottom 38 is shown on strap 20.

Figure 3:
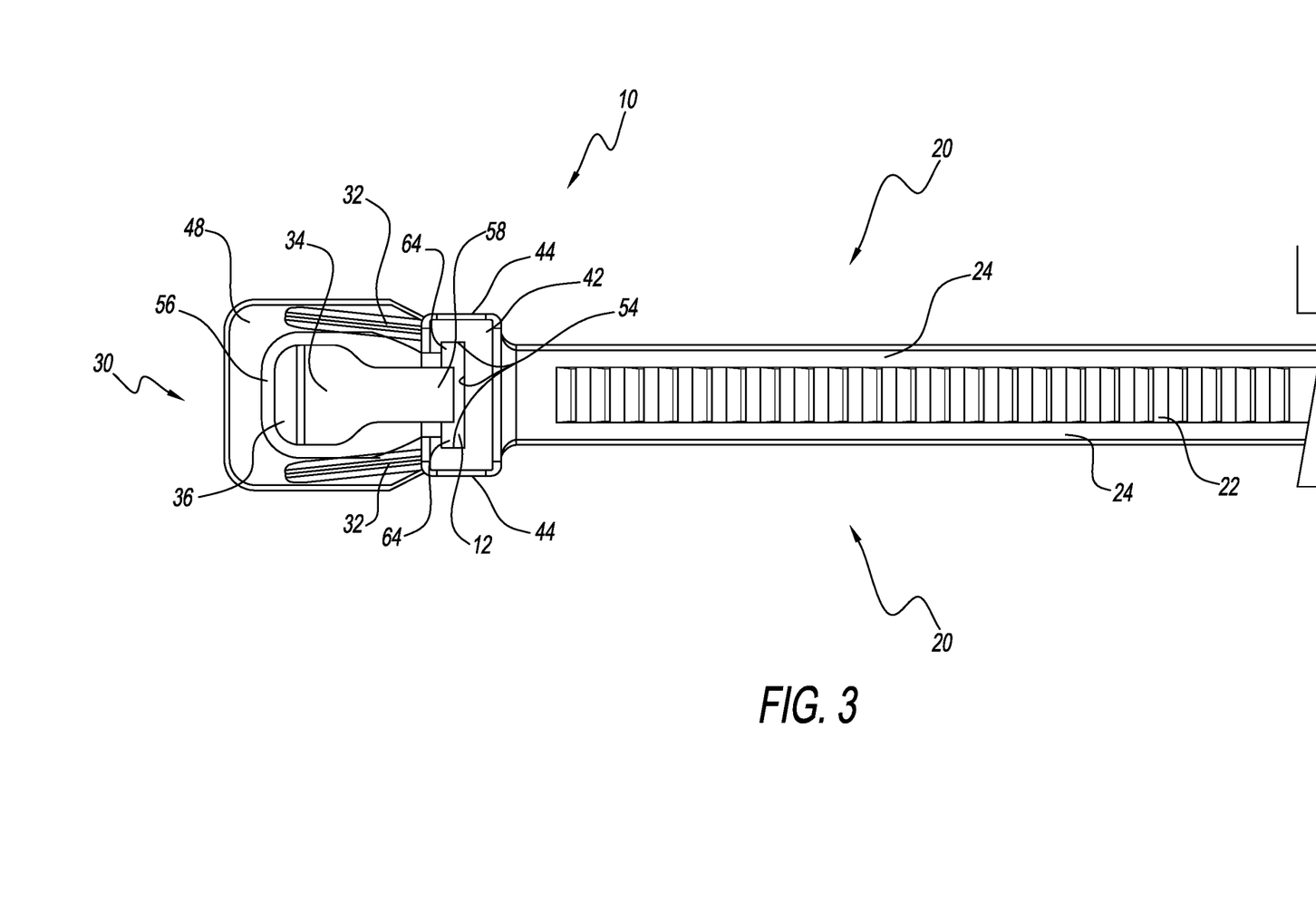
FIG. 3 is a close-up top plan view of the releasable cable tie according to a preferred embodiment of the present invention.
Figure 4:
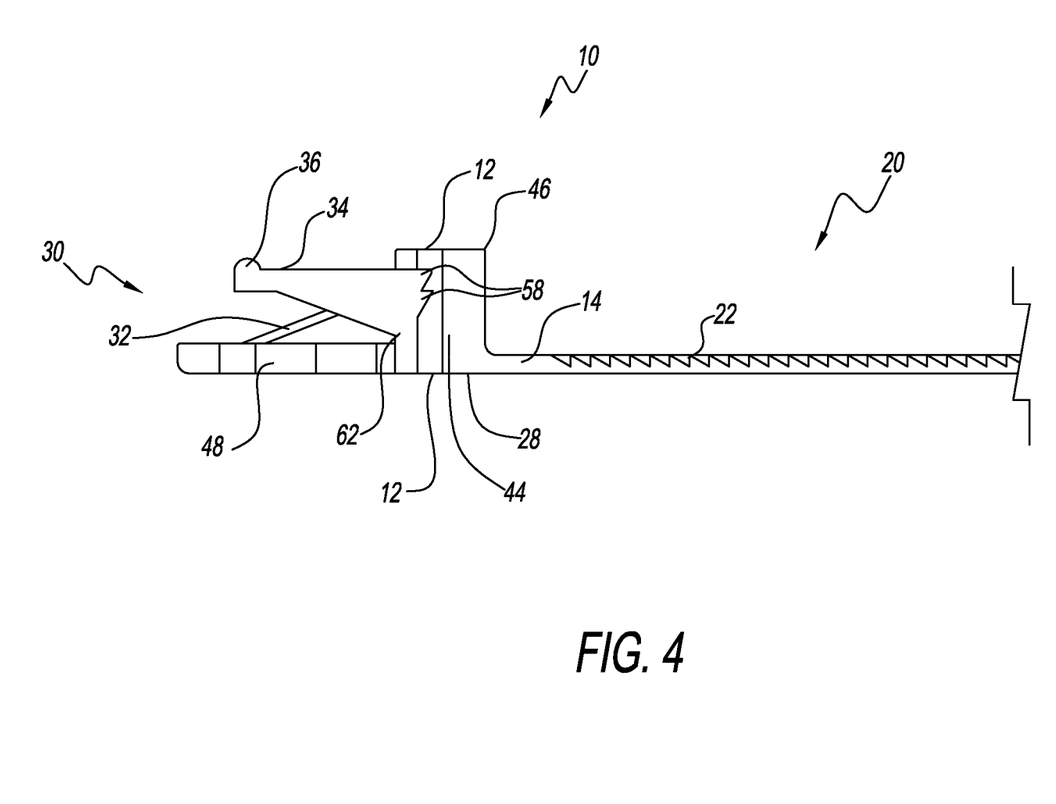
FIG. 4 is a close-up elevation view of the releasable cable tie according to a preferred embodiment of the present invention.

Referring now to FIG. 3 and FIG. 4, releasing locking head 42 includes releasing head side walls 44 and top releasing head 46. Locking head 30 incorporates index finger pad 48, releasing head mouth window/strap opening 12, strap inter mouth framing walls 54, releasing tab flow through 56, releasing head locking teeth 58, and releasing tab fulcrum 62. The index finger pad 48 provides a back plate positioned behind and below the thumb pad 34.

The Secure Cable Ties New EZ Releasable cable tie design of the present invention has been found to provide a quick, easy release, as well as a comfortable release trigger reaction. The EZ Releasable tie uses a novel wide release ripple trip/thumb grip 36 on thumb pad or paddle 34, as shown in the formal figures of the technical drawings, which thumb pad or paddle 34 creates a larger and wider surface area for the user.

The EZ releasable tie performs with a quick release and smooth operation because of the large surface area of thumb pad 34 and because the force or tensing required to release the locking teeth 58 is spread over the entire width of the user's thumb. The thumb pad 34 at ripple strip 36 is as wide as one third to one half (⅓ to ½) of the average thumb width of an operator which creates a more comfortable squeeze and release operation. An average thumb width is calculated at about 2.5 cm. The thumb pad 34 is formed to have a specified width.

The thumb pad 34 of the present invention is formed to have a width at least 90% of the strap 20 width. In a preferred embodiment, the thumb pad 34 is formed to have a width at least 95% of the strap 20 width.

In one embodiment, a thumb pad 34 has a width of 7.5 mm for a strap 20 width of 7.6 mm. In one embodiment, a thumb pad 34 has a width of 5.5 mm for a strap 20 width of 5.6 mm. In one embodiment, a thumb pad 34 has a width of 4.5 mm for a strap 20 width of 4.6 mm.

The index finger back plate 48 has dimensions of width and length at least as large as the width and length of thumb pad 34. That is to say, the width and length of the finger back plate 48 is at least as large as the width and length of thumb pad 34.

A thumb pad 34 release movement dimension of 0.5 mm actuates the withdrawal of the releasing head locking teeth 58 from the strap teeth 22 to release the cable tie of the present invention.

The index finger back plate 48 provides a back plate dimension at least 100% of the thumb pad width and length.

An average adult thumb width is approximately 2.5 cm in width. The thumb pad 34 is at least 3 mm in width and at least 6.5 mm in length to accommodate the average thumb width which creates a more comfortable squeeze and release operation.

The length of the thumb pad 34 is a function of the size of the tie 10. A tie 10 having a 7.6 mm strap 20 size has a thumb pad 34 length function in the range of at least 5 mm in length up to 19 mm in length with the preferred thumb pad function size being 14 mm in length for both comfort and ease of use.

The height of the thumb pad 34 above the index finger back plate 48 is a function of the size of tie 10. A tie 10 having a 7.6 mm strap 20 size has a thumb pad 34 height range at least 2 mm in height up to 7 mm in height with the preferred function height size being 3.5 mm in height above index finger back plate 48 for both comfort and ease of use.

As the tie 10 sizes get larger, so does the length of the thumb pad 34 and the range of function, and as the tie 10 size gets smaller, so does the length of the of the thumb pad and the range of function.

As the tie 10 sizes get larger, so does the height of the thumb pad 34 above the index finger back plate 48 get larger for the range of function, and as the tie 10 size gets smaller, so does the height of the of the thumb pad 34 above the index finger back plate 48 get smaller for the range of function and to accommodate the average thumb width which creates a more comfortable squeeze and release operation.

Prior art releasable cable ties normally have a much smaller release tab, causing pressure to the finger or fingernail and requiring much more force to release the locking teeth of the locking head from the locking teeth on the strap. The prior art makes for a more difficult and sometimes impossible tensing that will not allow the user to release the cable tie properly from the locked position, particularly in tight spaces or while cinched tightly.

With reference to FIG. 3 and FIG. 4, there is illustrated the construction of releasing locking head 42 of the locking head 30 including an integrally formed bottom releasing head 28 to which the top releasing head 46 is joined. The intermouth framing walls 54 extend between releasing head side walls 44 of the releasing locking head 42. The releasing tab fulcrum 62 beneath the release thumb pad 34 reinforces the release thumb pad 34. The releasing tab fulcrum 62 joins the upright portion of the release thumb pad 34 and not only strengthens the release thumb pad 34 but also defines the bend line or pivot line of the release thumb pad 34. The sides of the releasing head side walls 44 also include rearwardly extending portions a lesser height than the releasing head side walls 44 and serve to shield the release thumb pad 34 from sidewise interference, as well as to provide additional strength to the releasing head sidewalls 44.

Integrally formed on the thumb pad 34 for movement thereon and extending into the releasing head mouth 12 are the locking teeth 58. In the embodiment illustrated, two locking teeth on the inner surface of the thumb pad 34 define a part of releasing thumb pad 34 in the releasing locking head 42. The locking teeth 58 of the locking head are complementary to the teeth 22 on the strap 20 and extend a sufficient distance into releasing head mouth 12 to cooperate with selected strap locking teeth 22 so as to lock the strap in selected position around a plurality of electrical power cords and electrical cables to be secured to one another.

Referring now to FIG. 3 and FIG. 4, an enlarged top view shows the releasing strap 20. The gripping teeth or protuberances 22 extend a relatively short distance from the top surface of the releasing strap 20 and thereby enhance tightening of the releasing strap 20 inserted through the transverse releasing head mouth 12 in releasing locking head 42.

The releasing strap 20 of the present invention can be secured in position about a plurality of elongated electrical wires (not shown). The second opposite end 16 of strap 20 is inserted into the transverse opening of releasing head mouth 12 until the strap 20 is snugly drawn about a plurality of electrical wires or like parts to be joined together in fixed and secure relationship. With the release strap 20 tightly drawn about the wires, the complementary releasing locking teeth 22 are locked in relationship with locking head teeth 58. The edges of the teeth 22 normal to the base portion abut the edges of teeth 58 normal to the inner surface of release thumb pad 34. Retrogression or movement in a release direction is prevented because the abutting planar faces of the locking teeth 22 are in engagement with like cooperating surfaces on the selected cooperating teeth 58. Because of the transverse relationship of the releasing head mouth 12 relative to the plane of the strap 10, the structure of the complementary teeth 22 and 58 engage one another more firmly rather than to release from one another when the base portion is urged in a release direction.

Release of locking teeth 58 from the teeth 22 on strap 20 is attained and achieved by positive downward force being applied on the release thumb pad 34, so as to pivot the release thumb pad 34 relative to the releasing tab fulcrum 62 of releasing locking head 42 and thereby release the lock teeth 58 from engagement with the teeth 22 on the strap 20. A thumb pad 34 release movement dimension of 0.5 mm actuates the withdrawal of the releasing head locking teeth 58 from the strap teeth 22 to release the cable tie of the present invention. The strap 20 then can be moved in a release direction in the transverse releasing head mouth 12 so as to permit adjustment or removal of the electrical power cords or the electrical cables (not shown) from the tie 10.

Figure 5:
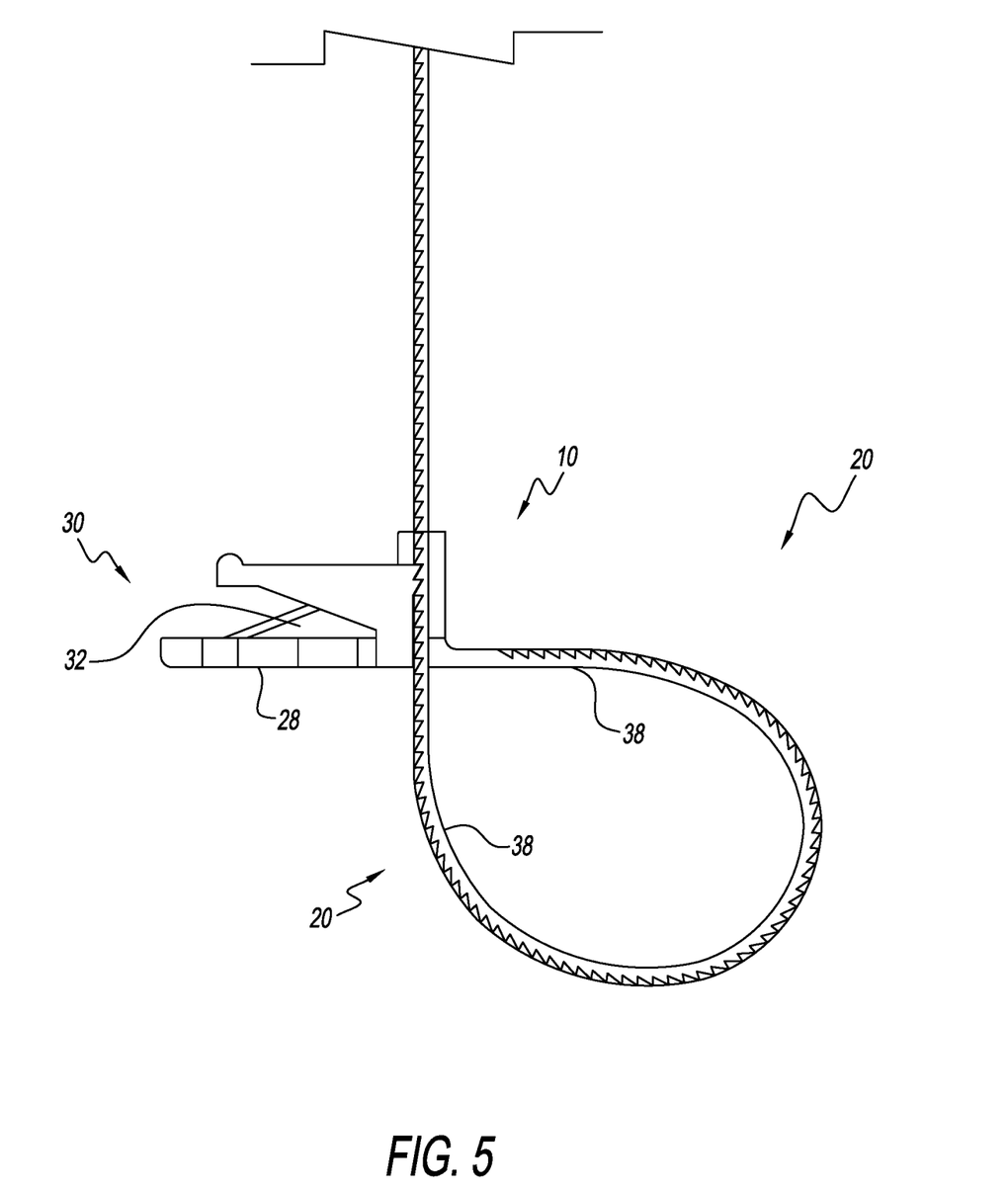
FIG. 5 is an elevation view of the releasable cable tie according to a preferred embodiment of the present invention showing the releasable strap held in position in the locking head.

Referring now to FIG. 5, an elevation view of the releasable cable tie 10 according to a preferred embodiment of the present invention shows the releasable strap 20 held in position in the locking head 30. The strap 20 is readily releasable by means of the integral releasable latch function of releasing locking head 30 and can be easily reapplied and adjusted as desired.

The releasing cable tie 10 preferably is molded in one piece integrally from thermoplastic, such as nylon or polypropylene and possesses sufficient strength and resiliency to permit the desired working thereof as well as the desired latching and release.

The releasing cable tie 10 may be color coded to enhance its use in certain industrial applications.

While the detailed description and identifying references to the formal views of the technical drawings have shown a presently preferred embodiment of the novel releasable cable tie of the present invention, it will be understood to be subject to modification and that the invention is intended to be limited only within the scope of the appended claims.

Secure Cable Ties

EZ Releasable Cable Tie Drawing Key

10 Releasing Cable Tie
12 Locking head window, Releasing head mouth (strap opening)
14 Strap body first end
16 Strap body second end
18 EZ Releasing strap length
20 Releasable Cable Tie Strap
22 EZ Releasing locking teeth (adjustable strap)
24 EZ Release glide rails
26 EZ Release strap tongue
28 Bottom releasing head
30 Releasing locking head
32 Index finger pad supports
34 EZ Release thumb pad
36 Release ripple strip for thumb grip
42 EZ Release locking head
44 EZ Releasing head side walls
46 Top releasing head
48 Index finger pad
54 Strap Inter mouth framing walls
56 EZ Releasing tab flow through
58 Locking teeth
62 EZ Releasing tab fulcrum
64 EZ Releasing glide track The releasable cable tie of the present invention has a releasing tab on the operating rod wherein the releasing tab stands erect off of the top of the tie when cinched. The tie also has a back plate positioned below and behind the releasing tab making it easier to pinch the releasing tab for release.

The releasable cable tie of the present invention provides a large and wide thumb pad or paddle release and an index finger pad back plate positioned below and behind the releasing thumb tab. The large and wide thumb pad is formed to have a preferred length and width on the releasable latch readily accessible by the user. The large pad or paddle release and index finger pad back plate make the releasing tab itself easier to pinch to release without having to use unnecessary force. The index finger pad back plate is positioned behind and below the thumb pad of the present invention.

The releasable cable ties of the present invention provide the significantly important benefit when the wide releasing tab pad stands erect off of the strap rather than lying directly on the strap when cinched. When the wide releasing tab pad stands erect a predetermined distance from the strap rather than lying directly on the strap when cinched, the user has plenty of room to be able to put a finger on both sides of the releasing tab pad giving ample leverage to pinch and release the tie easily. The old technology of the prior art does not allow for any room to get fingers behind the releasing tab when the tie is cinched tightly. In using the prior art cable ties, it has been found to be difficult to nearly impossible to be able to get enough leverage on the tab to be able to release the tie.

The releasable cable tie of the present invention is importantly novel in the way that the tie is configured to be released easily from a cable bundle compared to other releasable cable ties currently known. The releasing tab pad of the present invention is on top of the head rather than in the middle of the strap. Releasable cable ties having the releasing tab in the middle of the strap become very difficult to release when the cable tie is placed around a bunch of electrical cables when the electrical cables are cinched too tightly.

Prior art cable ties make depressing the releasing tab on the locking head very difficult and almost impossible in tight spaces because of the operator not being able to get any leverage on the releasing tab itself.

With the novel releasing tab pad of the present invention, the user/operator is able to access the releasing tab pad even while being cinched tightly around an electrical cable bundle.

The cable tie of the present invention can be released easily without resorting to cutting the cable tie off with dikes or wire cutters because of the cable tie being cinched too tightly around electrical cable bundles. When a releasable cable tie does not release properly, the user/operator must resort to cutting to remove the cable tie. The electrical cables that are strapped together then are at high risk for damage from the cutting tool blades. Damage to the electrical wire bundles will cause the electrical wires in the bundle to be damaged and rendered useless, and the entire electrical cable assembly must be rebuilt entirely to ensure that the electrical cables are damage free.

The top release cable tie of the present invention makes for easy access to the releasing tab pad as an over-loaded strap still can be released with a simple squeeze to the releasing tab.

The novel releasing tab pad of the present invention is much larger and wider and much easier to be depressed compared to prior tabs in the past.

The releasable cable tie of the present invention provides for easier access to hard to reach spots where a user/operator does not have room for two hands.

The large releasing tab having a large and wide release thumb pad and a finger plate back plate of the present invention allows for a quick squeeze from two fingers for a fast and easy release.

In conventional cable ties of the prior art, a reversed head releasable cable tie such as that disclosed and described in prior U.S. patents had a much smaller head design and a much slimmer strap design than the large and wide thumb pad of the present invention. The small head of prior cable ties made it much more difficult to squeeze and release and pull off the cable tie from a bundle that was in a tight spot because of the smaller gripping area. The head and tab of prior cable ties being much smaller made it much more difficult to nearly impossible in a tight space to find and squeeze while still trying to hold the head and pull off the cable tie.

With a larger and wider releasing thumb tab pad of the present invention and larger index finger back plate having raised bumps, it is very easy to grip and grab with two fingers while squeezing and pulling the cable tie and releasing the cable tie from the electrical cable bundle even while the cable tie is cinched tightly.

The important difference between the releasable cable tie thumb pad of the present invention and prior art releasable cable ties is the finger grip plate and the larger release tab thumb pad that is much easier to hold, squeeze, and release.

The releasable cable tie apparatus and method of the present invention provide the only EZ Releasable Cable Tie that can be cinched tightly to hold bundled items securely, while also being able to be removed fast and easily with one hand or two finger motion.

Prior releasable cable ties do not allow for the cable tie to be cinched down tightly around cables and be easily removed. Prior ties do not provide the proper leverage to the tab to release the older styles of releasable cable ties. The prior releasable ties do not allow the user/operator to get one finger behind the tie while squeezing the release tab when the releasable tie was wrapped too tightly around cables.

The new Secure EZ Releasable Cable Tie design of the releasable cable tie of the present invention has been developed when a major airliner manufacturer requested a product that could fit in their small circular supports that they use to secure electrical cables to the sides of the airliner's airplanes. The airliner manufacturer needed a product that could be used in a temporary fashion while installing and wiring the planes until the permanent fly-away cable tie could be installed during the final assembly. The common request from all of the electricians and other production personnel involved at the airliner manufacturer was to have a releasable tie that could hold fifty (50) pounds or more and could be removed easily without having to cut it way from the cable assembly. The releasable cable tie needed to be able to be cinched tightly around the electrical cable assemblies but still needed to release easily.

The process to create and solve the airliner manufacturer's problem was not available from prior art cable ties and was not as simple as it may appear at first impression. To get to the configuration and structure of the releasable cable tie of the present invention with the New Secure Cable Tie Releasable tie, it took many empirical developments before finding the current configuration and structure. In respect to understanding the problem with leverage, it was needed to find ways to get two fingers behind the releasable tab. Initial development started with a gun design that was like squeezing a trigger. The gun design was overly large and still seemed to be a problem for manufacturing and for the user/operator to get one finger behind the release tab. The development subsequently then used trial and error to produce the New Secure Cable Tie Releasable tie of the present invention, and it was found that the user/operator still could not get sufficient leverage on the release tab. After many trials and errors, it has been found empirically and configured finally that a pad or paddle lever of the present invention provides much more comfortable operation for the operator/user, as well as providing the proper leverage required to release the novel releasable cable tie of the present invention that was cinched tightly around an electrical cable bundle.

When the Secure Cable Ties New EZ releasable tie was developed for a large airline manufacturer, the airline manufacturer came with a specified need to be able to remove cable ties from an airplane's fuselage during the construction of an aircraft. The airline manufacturer needed a product that was easy to use and operate and would release from the electrical wiring harness when the permanent or fly-away cable ties were installed on the completed wiring harness. The airline manufacturer had tried all the releasable cable ties available on the open market without success until the novel releasable cable tie of the present invention was developed and worked experimentally to solve the problem with significant success.

The releasable cable tie apparatus and method of the present invention has the important novel configuration in that the release tab thumb pad stands erect off of the tie when cinched. The novel tie also has an index finger back plate positioned behind and below the tab thumb pad making it easier to pinch the tab for release.

Most prior art releasable ties, when cinched tightly, leave no room to be able to get fingers in between the strap and the tab. Most prior art releasable ties make it impossible to get leverage on the tab to be able to pinch the tab and release the strap, which causes the operator/user then to cut the strap instead. Other releasable cable ties have a latch that is inadequately designed so that the operator/user has to use a strong fingernail or a screw driver to be able to release them.

Some prior art releasable ties have a tab located on the strap that can be pinched and released. Those prior art releasable ties, when cinched, no longer get leverage on the tab to be able to pinch and release it.

The novel large and wide release tab thumb pad of the present invention stands erect off of the top of the strap and allows the operator/user to be able to get a finger on both sides of the tab pad to be able to easily pinch and release the tie.

The tab thumb pad sitting erect off of the top of the strap works so well that the operator can access the tab thumb pad easily and release the tie without straining the operator's fingers.

An important feature and benefit that differentiates the releasable cable tie of the present invention from any others is the fact that the releasing tab thumb pad stands erect off of the top of the strap rather than lying directly on the strap when cinched. The novel releasable cable tie of the present invention gives the user plenty of room to be able to put a finger on both sides of the tab pad giving ample leverage to be able to easily pinch and release the tie. The old technology did not allow for any room to be able to get fingers behind the tab when the tie is cinched tightly, making it impossible to be able to get enough leverage on the tab to be able to release the tie.

The present invention provides a large and wide pad or paddle release and index finger back plate that makes the releasing tab thumb pad itself much easier to pinch to release without having to use a lot of force.

The releasable cable ties are produced using thermoplastic resin through an injection mold. In one aspect, the releasable cable ties are constructed using polypropylene or nylon. In one aspect, the releasable cable ties are constructed using Nylon 66.

The important advantage that the releasable one-piece thermoplastic cable tie of the present invention provides is the fact that the large and wide tab thumb pad stands erect off of the top of the strap rather than lying directly on the strap when cinched, thereby giving the user plenty of room to be able to put a finger on both sides of the tab thumb pad giving ample leverage to be able to easily pinch and release the tie. The old technology did not allow for any room to be able to get fingers behind the tab when the tie is cinched tightly, making it very difficult to nearly impossible to be able to get enough leverage on the releasing tab to be able to release the tie. The novel releasable cable ties provide the novel large pad or paddle release and index finger back plate, making the tab itself easier to pinch to release without having to use a lot of force.

It has been found that the novel releasable cable tie of the present invention was able to be tightly cinched and then easily released within seconds using only two fingers without snagging or jamming in the process.

The important advantages, features, and benefits of the novel releasable cable tie of the present invention that were observed were the ease of use, ability to secure tightly, high strength of the grip of the tab thumb pad itself, quickness of release, and overall durability.

The improvement of the novel releasable cable tie of the present invention further has been found experimentally to provide to the airliner production manufacturer a releasing thumb pad pinch force needed to make it releasable in previously very difficult areas on the airplane and further so there was no chance that the ties could be released accidentally, and further was found to provide a more pliable size particularly suitable for tight areas experienced in airliner production manufacturing today.

The releasable tie of the present invention has been found experimentally to be operated with one hand or two fingers in very tight locations in the front of the airplane where all the cables are tied into the control panels. The front of the airplane has very tight bundles of cables and most of these bundles are positioned on top of each other. It is very hard for the electricians to remove the releasable cables ties. Most of the time, electricians are forced to cut the conventional ties because of an inability to get more than a hand into these places to squeeze the cable ties, since the cable ties on the market today require two hands to release the ties.

The electricians normally need to release 50 or 100 plus releasable ties daily when the wire harnesses are complete. With this number of releasable ties to release, squeezing a regular releasable tie causes pain and discomfort to the operator. The releasable tie of the present invention has been found to overcome the discomfort problem. By making the releasable tab larger and wider, the novel large thumb pad in the releasable tie of the present invention displaces the surface area of the thumb and makes for a much more comfortable release.

It has been found empirically that an unexpected benefit of the larger and wider release tab is an easy release of the locking teeth. With more leverage at the thumb pad, less force is required on the thumb or finger for the electricians to release and pull the new releasable ties of the present invention from any tight location with ease.

The releasable cable tie of the present invention requires users to use only two fingers on the same hand to squeeze and release the releasable tie while it was under pressure. The releasable cable tie of the present invention in preferred embodiment having a 7.6 mm strap size and having the locking head and novel fulcrum, provides a much stronger releasable tie having a releasing tab function which has been found to perform extremely well with an overall tensile strength of more than one hundred (100) lbs, together with providing a release tab made much more stable which reduces the chances of an accidental release.

With the strength and comfort and ease of release of the new releasable tie of the present invention, all the wish list requirements identified by large airliner production are met by the new releasable tie. The problems of removing releasable ties from tight locations are solved with one hand or two finger releases and release pulls without resorting to cutting the ties to remove and damage the wiring harnesses.

The invention claimed is:

1. A releasable cable tie, comprising:
    a molded one-piece thermoplastic elongated planar strap, wherein said strap includes a plurality of strap teeth formed on one side of said strap; and
    a locking head formed at one end of said strap and formed integrally with said strap, wherein said locking head includes
        an opening therethrough on a first end of said locking head adjacent the one end of the strap, wherein said opening is for receiving an opposite end of said strap, said opposite end being insertable into said opening in a locking direction and forming a loop to receive cables to be bound, said strap teeth being positioned external to the loop and away from the cables to be bound;
        a releasable latch having at least one latch lock tooth complementary to said strap teeth and extending into said opening and adapted to engage with at least one strap tooth for preventing movement of said strap in a release direction;
        a pad extending from said releasable latch toward a second end of said locking head, wherein said pad is readily accessible by a user and configured to be depressed by a thumb of the user, said pad being deflected about a pivot line on said releasable latch when depressed to release the at least one lock tooth from engagement with the at least one strap tooth to permit the strap to be moved in the release direction; and
        a back plate extending from the opening toward the second end of said locking head, wherein the back plate is positioned below said pad, wherein said back plate is readily accessible by the user and configured to provide support for an index finger of the user, wherein said pad and said back plate extend substantially perpendicular to said strap in a direction away from the loop when said strap is in said opening, and wherein said back plate has a width and a length at least as wide and long as said pad.

2. The releasable cable tie as set forth in claim 1, wherein said at least one latch lock tooth is on a side of the opening that said strap teeth face when traversing the opening, wherein said at least one latch lock tooth is directly actuated by movement of said pad so as to move said at least one latch lock tooth from locking engagement with said at least one strap tooth a sufficient distance to enable movement of said strap in the release direction.

3. The releasable cable tie as set forth in claim 1, wherein said pad has a width at least 90% of width of the strap.

4. The releasable cable tie as set forth in claim 3, wherein said pad includes a ripple strip at far end thereof.

5. The releasable cable tie as set forth in claim 1, wherein the at least one latch lock tooth is positioned at one end of the releasable latch and the pad is positioned at an opposite end of the releasable latch, wherein the releasable latch further includes a fulcrum supporting the releasable latch, whereby pressure on an end of the pad will pivot the releasable latch about the fulcrum and free the at least one latch lock tooth from engagement with the at least one strap tooth.

6. The releasable cable tie as set forth in claim 5, wherein the fulcrum is positioned below the at least one latch lock tooth.

7. The releasable cable tie as set forth in claim 6, wherein the locking head further includes side walls reinforcing the releasable latch and constructed and arranged to define the fulcrum and pivot line for the releasable latch.

8. A method of tying and securing electrical cables, comprising:
    providing a molded one-piece plastic elongate planar strap having a plurality of strap teeth formed on one side of said strap and a locking head formed on one end of said strap;
    inserting an opposite end of said strap into an opening in said locking head in a locking direction and forming a loop to receive cables to be bound, wherein the plurality of strap teeth are positioned external to the loop and away from the cables to be bound and said locking head extends substantially perpendicular to said strap in a direction away from the loop;

locking said strap in said locking head by engaging at least one lock tooth formed in a releasable latch of said locking head complementary to said strap teeth and extending into said opening with at least one strap tooth for preventing movement of said strap in a release direction;

releasing said locked strap by activating the releasable latch on said locking head by depressing with a first finger a pad extending from said releasable latch away from the opening that is readily accessible by the user, said releasable latch extending away from said strap when said strap is in said opening, said latch being deflected about a pivot line on the locking head to release the lock tooth from engagement with the at least one strap tooth to permit the strap to be moved in a release direction; and removing said strap from said locking head by placing a second finger on a back plate positioned below the pad while the pad is being depressed by the first finger so as to secure the releasable between the first and the second finger and pulling the releasable latch in a direction away from the loop, wherein said back plate has a width and a length at least as wide and long as said pad.

9. The method of tying and securing electrical cables as set forth in claim 8, wherein said at least one latch lock tooth is on a side of the opening that said strap teeth face when traversing the opening, wherein said at least one latch lock tooth is directly actuated by movement of said pad so as to move said at least one latch lock tooth from locking engagement with said at least one strap tooth a sufficient distance to enable movement of said strap in the release direction.

10. The method of tying and securing electrical cables as set forth in claim 8, wherein said pad has a width at least 90% of width of the strap and includes a ripple strip at far end thereof.

11. The method of tying and securing electrical cables as set forth in claim 8, wherein said pad has a width at least 95% of a width of the strap.

12. The method of tying and securing electrical cables as set forth in claim 8, wherein the at least one latch lock tooth is positioned at one end of the releasable latch and the pad is positioned at an opposite end of the releasable latch, wherein the releasable latch further includes a fulcrum supporting the releasable latch and positioned below the at least one latch lock tooth, whereby pressure on an end of the pad will pivot the releasable latch about the fulcrum and free the at least one latch lock tooth from engagement with the at least one strap tooth.

13. The method of tying and securing electrical cables as set forth in claim 12, wherein the locking head further includes side walls constructed and arranged so as to define and reinforce the fulcrum and said pivot line for the releasable latch.

14. A releasable cable tie, comprising:
an elongated planar strap having a plurality of teeth formed on a first side thereof; and
a locking head formed on a first end of the strap, the locking head including
an opening formed therethrough on a first end of the locking head that is adjacent the first end of the strap, wherein the opening is formed transverse to an axis of the strap, wherein the opening is for receiving a second end of said strap in a configuration where the plurality of teeth face a first side of the opening, wherein after the strap is inserted into the opening a loop is formed to receive cables to be bound, wherein the plurality of teeth are external to the loop;
a releasable latch having at least one locking tooth extending into the first side of the opening, wherein the at least one locking tooth is complementary to the plurality of teeth on the strap so as to engage with at least one strap tooth, wherein the engagement of the at least one locking tooth with the at least one strap tooth enables the strap to move in a first direction to shrink a circumference of the loop while preventing the strap from moving in a second direction to expand or eliminate the loop;
a pad extending from the releasable latch toward a second end of the locking head, wherein the pad is configured to have a width at least 95% of width of the strap and to have a ripple strip at a far end thereof;
a back plate extending from the opening toward the second end of the locking head, wherein the back plate is configured to be positioned below the pad and to have a width and a length at least as large as the width and a length of the pad;
a fulcrum positioned below the releasable latch to support the releasable latch and provide a pivot line for the releasable latch; and
side walls reinforcing the releasable latch and defining the fulcrum and the pivot line for the latch, wherein
the pad and the backplate of the locking head extend substantially perpendicular to the strap in a direction away from the loop when the strap is in the opening;
the pad and the backplate are readily accessible to a user;
the pad is configured to be depressed by a first finger of the user;
the backplate is configured to be supported by a second finger of the user;
the at least one latch lock tooth is directly actuated by movement of the pad such that a sufficient downward movement moves the at least one latch lock tooth from locking engagement with the at least one strap tooth to enable movement of the strap in the second direction.

15. The releasable cable tie of claim 14, wherein the second finger on the back plate provides leverage to enable the first finger to depress the pad.

16. The releasable cable tie of claim 14, wherein the user pinches the locking head between the first finger and the second finger to remove the strap from the locking head.

17. The releasable cable tie of claim 14, wherein the back plate includes an opening therein that the second finger is able to grip to.

18. The releasable cable tie of claim 14, wherein one or more of the length of the pad and height of the pad above back plate are a function of width of the strap.

* * * * *